(12) United States Patent
Noguchi et al.

(10) Patent No.: US 11,892,337 B2
(45) Date of Patent: Feb. 6, 2024

(54) MEASURING DEVICE

(71) Applicants: Sintokogio, Ltd., Nagoya (JP); Toyota Jidosha Kabushiki Kaisha, Toyota (JP)

(72) Inventors: Youhei Noguchi, Toyokawa (JP); Koji Sakou, Toyokawa (JP); Hirotaka Kurita, Toyokawa (JP); Takashi Nagaya, Toyokawa (JP); Hirotsune Watanabe, Miyoshi (JP); Takumi Maegawa, Toyota (JP)

(73) Assignees: Sintokogio, Ltd., Aichi (JP); Toyota Jidosha Kabushiki Kaisha, Aichi-Ken (JP)

( * ) Notice: Subject to any disclaimer, the term of this patent is extended or adjusted under 35 U.S.C. 154(b) by 558 days.

(21) Appl. No.: 17/258,622

(22) PCT Filed: Jun. 5, 2019

(86) PCT No.: PCT/JP2019/022389
§ 371 (c)(1),
(2) Date: Jan. 7, 2021

(87) PCT Pub. No.: WO2020/012832
PCT Pub. Date: Jan. 16, 2020

(65) Prior Publication Data
US 2021/0270664 A1   Sep. 2, 2021

(30) Foreign Application Priority Data

Jul. 10, 2018 (JP) ................. 2018-131032

(51) Int. Cl.
*G01G 13/06* (2006.01)
*G01G 13/24* (2006.01)
(52) U.S. Cl.
CPC ............ *G01G 13/06* (2013.01); *G01G 13/24* (2013.01)

(58) Field of Classification Search
CPC .............................. G01G 13/06; G01G 13/24
(Continued)

(56) References Cited

U.S. PATENT DOCUMENTS 3,826,203 A * 7/1974 Martin ..................... B61D 7/20
105/310
4,938,385 A * 7/1990 Hayashi ................ G01G 13/16
222/638

(Continued)

FOREIGN PATENT DOCUMENTS

EP     0677723 A1   10/1995
JP    H0787965 B2    9/1995
(Continued)

OTHER PUBLICATIONS

International Search Report, Japan Patent Office, International Application No. PCT/JP2019/022389, dated Jul. 2, 2019, 2 pages.
(Continued)

*Primary Examiner* — Jacques M Saint Surin
(74) *Attorney, Agent, or Firm* — Taft Stettinius & Hollister LLP (57) ABSTRACT

An opening portion that is formed so as to pass-through an opening/closing plate portion of a gate, can be disposed at a region overlapping a lower end opening of a hopper. The opening portion is structured by a first pass-through portion, and a second pass-through portion that is formed so as to be continuous with the first pass-through portion. A width, in a direction orthogonal to a lined-up direction in which the first pass-through portion and the second pass-through portion are lined up, is narrower than the first pass-through portion. Further, a driving mechanism moves the gate such that the opening/closing plate portion moves in the lined-up direction as seen in a plan view. Based on a preset target value of weight of sand, a control section controls the driving mechanism so as to decrease an amount of overlap of the opening (Continued)

portion of the gate and the lower end opening of the hopper in a stepwise manner in accordance with an increase in the weight of the sand measured by a scale.

7 Claims, 5 Drawing Sheets

(58) Field of Classification Search
 USPC .......................................................... 177/245
 See application file for complete search history.

(56) References Cited

U.S. PATENT DOCUMENTS

| | | | | |
|---|---|---|---|---|
| 5,204,884 | A * | 4/1993 | Leary | B07C 5/3425 377/10 |
| 5,667,108 | A | 9/1997 | Braun et al. | |
| 7,193,162 | B2 * | 3/2007 | McIsaac | G01G 19/00 177/16 |
| 7,855,343 | B2 * | 12/2010 | Nakagawa | B65G 69/16 198/530 |
| 7,866,880 | B1 * | 1/2011 | Scism | G01F 19/007 73/427 |
| 9,573,755 | B2 * | 2/2017 | Nagai | G01G 19/393 |

FOREIGN PATENT DOCUMENTS

| | | | | |
|---|---|---|---|---|
| JP | | 2787284 | B2 | 8/1998 |
| JP | | 3577177 | B2 * | 10/2004 ........... B06B 1/0246 |

OTHER PUBLICATIONS

Written Opinion of the International Searching Authority, Japan Patent Office, International Application No. PCT/JP2019/022389 dated Jul. 2, 2019, 4 pages.

\* cited by examiner

MEASURING DEVICE

CROSS-REFERENCE TO RELATED APPLICATIONS

This application is a U.S. National Phase Application of International Patent Application No. PCT/JP2019/022389, which was filed on Jun. 5, 2019, and which claims the benefit of, and priority to, Japanese Patent Application No. 2018-131032, which was filed on Jul. 10, 2018. The contents of each application are incorporated herein by reference in their entirety.

TECHNICAL FIELD

The present disclosure relates to a measuring device.

BACKGROUND ART

Techniques for measuring granular substances are known. For example, Japanese Examined Patent Application Publication (JP-B) No. H07-87965 discloses, in a structure that can supply sand that is within a hopper to a blow head, a device that can stop the supply of sand to the blow head by closing a shutter by timer control.

SUMMARY OF INVENTION

However, in the case of the above-described technique, there is room for improvement with regard to the point of measuring sand at high speed and with high accuracy.

In view of the above-described circumstances, an object of the present disclosure is to provide a measuring device that can measure a granular substance at high speed and with high accuracy.

A measuring device relating to a first aspect comprises: a hopper that receives a granular substance that is an object of measurement; a gate that has an opening/closing plate portion, which is for opening and closing a lower end opening of the hopper and which, with the lower end opening, can form a supply port of the granular substance and in which an opening portion is formed, the opening portion being structured by a first pass-through portion and a second pass-through portion that is formed to be continuous with the first pass-through portion and that has a width, in a direction orthogonal to a lined-up direction in which the first pass-through portion and the second pass-through portion are lined up, is narrower than the first pass-through portion, and the opening portion being able to be disposed at a region overlapping the lower end opening; a driving mechanism that moves the gate such that the opening/closing plate portion moves in the lined-up direction as seen in a plan view; a measuring section that is provided at a lower side of the hopper, and that measures a weight of the granular substance that is supplied from the supply port; and a control section that, based on a preset target value of the weight of the granular substance, controls the driving section such that an amount of overlap of the opening portion and the lower end opening decreases in accordance with an increase in the weight of the granular substance measured by the measuring section, and so as to go through a step in which a state, in which an entire region of the first pass-through portion overlaps the lower end opening, is maintained for a predetermined time period, and a step in which a state, in which an entire region or substantially the entire region of the first pass-through portion is adjacent to, or is distant from the lower end opening, and a partial region of the opening portion overlaps the lower end opening, is maintained for a predetermined time period, and moreover, such that, when the weight of the granular substance measured by the measuring section coincides with the target value, a state occurs in which the opening portion is adjacent to, or is distant from the lower end opening.

In accordance with the measuring device relating to the first aspect, the hopper receives a granular substance that is the object of measurement. The opening/closing plate portion of the gate, which is for opening and closing the lower end opening of the hopper, can, together with the lower end opening of the hopper, form the supply port of the granular substance. The opening portion is formed so as to pass-through the opening/closing plate portion. This opening portion is structured by the first pass-through portion, and the second pass-through portion that is formed to be continuous with the first pass-through portion and that has a width, in the direction orthogonal to a lined-up direction in which the first pass-through portion and the second pass-through portion are lined up, is narrower than the first pass-through portion. The opening portion is able to be disposed at a region overlapping the lower end opening of the hopper. Further, the driving mechanism moves the gate such that the opening/closing plate portion moves in the lined-up direction, as seen in a plan view. Further, the measuring section, which is disposed at the lower side of the hopper, measures the weight of the granular substance that is supplied from the supply port.

Here, based on a preset target value of the weight of the granular substance, the control section controls the driving mechanism such that an amount of overlap of the opening portion of the gate and the lower end opening of the hopper decreases in accordance with an increase in the weight of the granular substance measured by the measuring section. Further, the control section controls the driving mechanism so as to go through a step in which a state, in which the entire region of the first pass-through portion overlaps the lower end opening of the hopper, is maintained for a predetermined time period, and a step in which a state, in which an entire region or substantially the entire region of the first pass-through portion is adjacent to, or is distant from the lower end opening of the hopper, and a partial region of the opening portion overlaps the lower end opening of the hopper, is maintained for a predetermined time period. Moreover, the control section controls the driving mechanism such that, when the weight of the granular substance measured by the measuring section coincides with the preset target value, a state occurs in which the opening portion of the gate is adjacent to, or is distant from the lower end opening of the hopper. Due to the above, in a predetermined time period from the start of the supplying of the granular substance, the supplied amount per unit time can be made to be large. On the other hand, in the step of the end stage of the supplying of the granular substance, by limiting the supplied amount per unit time, the granular substance exceeding the target weight can be suppressed effectively.

In a measuring device relating to a second aspect, in the measuring device relating to the first aspect, a length direction of the second pass-through portion is the lined-up direction, and the second-pass through portion is formed in a shape in which a region, at which the width is constant, extends.

In accordance with the measuring device relating to the second aspect, it is easy to control the amount, per unit time, of the granular substance that passes-through the supply port.

In a measuring device relating to a third aspect, in the measuring device relating to the second aspect, the control section controls the driving mechanism so as to go through a step in which a state, in which only a partial region of the second pass-through portion of the opening portion overlaps the lower end opening, is maintained for a predetermined time period.

In accordance with the measuring device measuring device relating to the third aspect, in the end stage of the supplying of the granular substance from the supply port, it goes through a step in which the state, in which only a partial region of the second pass-through portion of the opening portion of the gate overlaps the lower end opening of the hopper, is maintained for a predetermined time period. Therefore, the granular substance can be supplied little-by-little to the measuring section, and the supplying of the granular substance can be stopped immediately when the weight of the granular substance within the measuring section reaches the target value. Due thereto, the weight of the granular substance within the measuring section can be made to match the target value of the weight with high accuracy.

In a measuring device relating to a fourth aspect, in the measuring device relating to any one of the first aspect through the third aspect, the control section controls the driving mechanism so as to go through a step in which a state, in which an entire region of the opening portion overlaps the lower end opening, is maintained for a predetermined time period.

In accordance with the measuring device relating to the fourth aspect, during a predetermined time period from the start of the supplying of the granular substance from the supply port, the entire region of the opening portion of the gate overlaps the lower end opening of the hopper. Therefore, the granular substance can be supplied to the measuring section at a high speed.

In a measuring device relating to a fifth aspect, in the measuring device relating to any one of the first aspect through the fourth aspect, the gate is supported so as to be able to rotate around a shaft than runs along a horizontal direction, the opening/closing plate portion is, as seen in an extending direction of the shaft, formed in a shape of a circular arc whose center is the shaft, and the gate has, at both lateral sides of the extending direction of the shaft, a pair of side plate portions that are connected to the opening/closing plate portion and that structure side surfaces.

In accordance with the measuring device relating to the fifth aspect, at the time of supplying the granular substance from the supply port to the measuring section, the granular substance spilling over into the measuring section from portions other than the supply port can be suppressed well by the pair of side plate portions.

In a measuring device relating to a sixth aspect, in the measuring device relating to any one of the first aspect through the fifth aspect, the driving mechanism is structured to include an electric servo motor.

In accordance with the measuring device relating to the sixth aspect, the gate can be moved accurately by the driving of an electric servo motor.

In a measuring device relating to a seventh aspect, in the measuring device relating to any one of the first aspect through the sixth aspect, a vibrator that vibrates the hopper, and the control section controls the vibrator so as to vibrate the hopper by the vibrator in a case in which a time period, which is from a point in time when supplying of the granular substance from the supply port to the measuring section starts, exceeds a preset time period, and a weight of the granular substance that is measured at the measuring section has not reached the target value.

In accordance with the measuring device relating to the seventh aspect, even in a case in which, for example, it is difficult for the granular substance within the hopper to flow or the granular substance becomes packed together in an extremely high humidity environment, the granular substance within the hopper can be made to flow due to the hopper being vibrated by the vibrator.

As described above, in accordance with the measuring device of the present disclosure, there is the excellent effect that a granular substance can be measured at high speed and with high accuracy.

DESCRIPTION OF EMBODIMENTS

Figure 1:
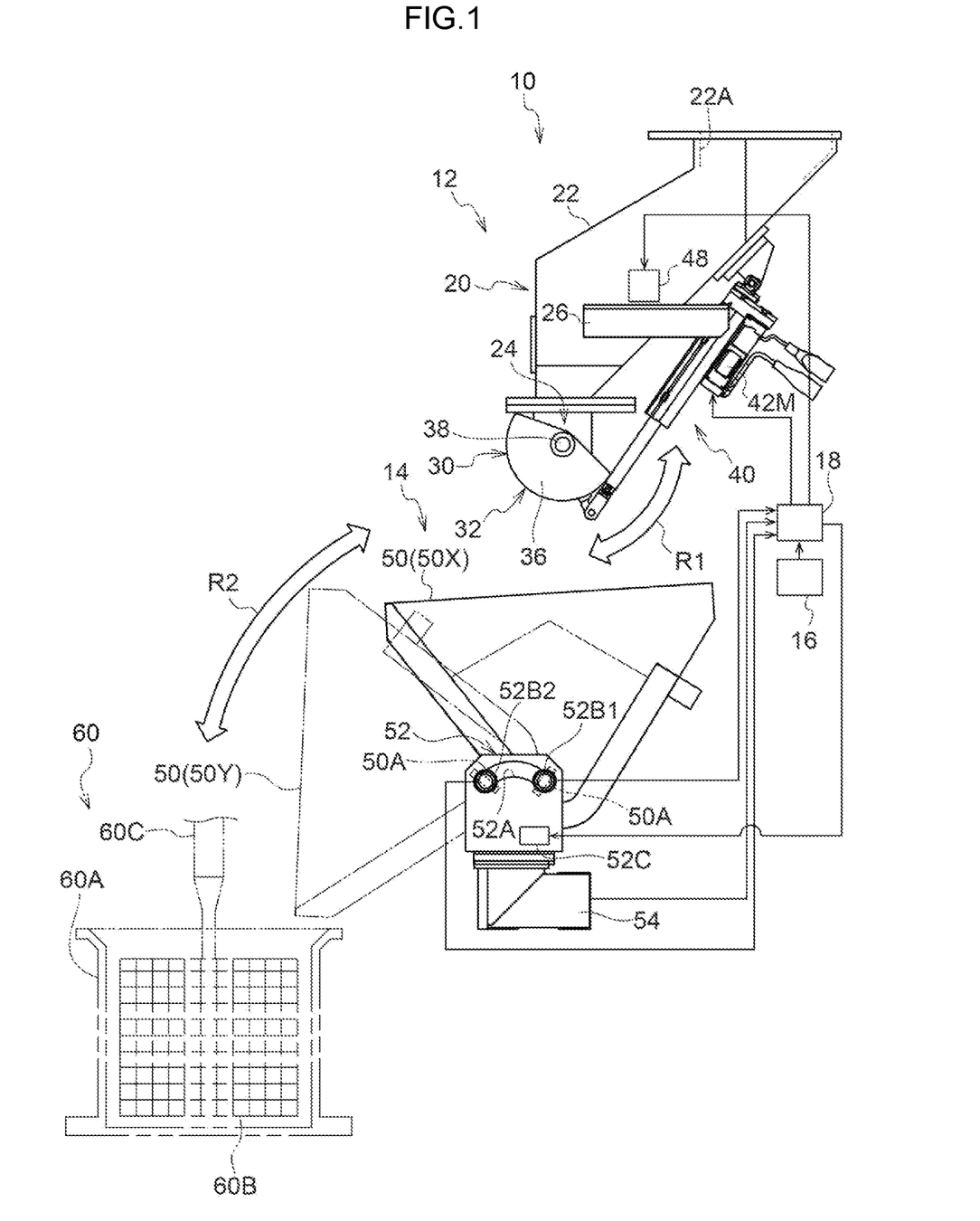
FIG. 1 is a front view showing a measuring device relating to an embodiment of the present disclosure and peripheral devices thereof.

A measuring device relating to an embodiment of the present disclosure is described by using FIG. 1 through FIG. 3. In FIG. 1, a measuring device 10 relating to the present embodiment and peripheral devices thereof are shown in a front view. The measuring device 10 in the present embodiment, as an example, structures a portion of a mold forming apparatus.

(Overview of Measuring Device 10 and Peripheral Devices Thereof)

First, the measuring device 10 and the peripheral devices thereof that are shown in FIG. 1 are described summarily. As shown in FIG. 1, the measuring device 10 has a supply device 12 for measurement, and a measuring/pouring device 14 that serves as a measuring section and is disposed at the lower side of the supply device 12 for measurement. The supply device 12 for measurement is a device for supplying sand, which serves as a granular substance that is the object of measurement (hereinafter, simply called "sand"), to the measuring/pouring device 14. The measuring/pouring device 14 has the function of measuring the weight of the sand that is supplied from the supply device 12 for measurement.

A stirring tank (also called "kneading cauldron") 60A of a stirring device 60 is disposed at an obliquely lower side of the measuring/pouring device 14. The measuring/pouring device 14 is structured so as to pour sand of an amount of a predetermined weight into the stirring tank 60A. A water-soluble binder, water, and additives are poured (supplied) into the stirring tank 60A, in addition to the raw material of a foamed mixture, and concretely, the aforementioned sand. Further, a stirring blade (also called "kneading blade") 60B is disposed within the stirring tank 60A. The stirring blade 60B has, as an example, a lattice-shaped mesh portion. This stirring blade 60B is fixed to the lower end of a rotating shaft 60C, and the rotating shaft 60C is structured so as to rotate around its own axis. Note that the foamed mixture that is stirred and produced by the stirring blade 60B within the stirring tank 60A is press-fit into an unillustrated mold.

Further, the measuring device 10 has an operation section 16 (shown as a block in the drawings). The operation section 16 is structured so as to be able to input a target value of the weight of the sand that is supplied to the measuring/pouring device 14, and the like, and is structured so as to output a signal, which corresponds to the inputting operation, to a control section 18 (shown as a block in the drawings). The control section 18 is structured so as to control the operations of the measuring device 10 based on the signals outputted from the operation section 16. To describe this further, the control section 18 is a functional section that controls the operations of the measuring device 10 by a control device in which, for example, a CPU, a RAM, a ROM, and an input/output interface portion (I/O) are connected to one another via a bus. At the above-described control device, a control program is read-out from the ROM and is expanded in the RAM, and the control program that is expanded in the RAM is executed by the CPU. Note that the control section 18 has a time counting function of counting the time from the point in time when the supplying of sand from the supply device 12 for measurement to the measuring/pouring device 14 starts.

(Concrete Structure of Measuring Device 10)

The structure of the measuring device 10 will be described more concretely next.

The supply device 12 for measurement of the measuring device 10 has a hopper (also called a "chute") 20 that receives sand, a gate 30 that is disposed at the lower end side of the hopper 20, and a driving mechanism 40 that moves the gate 30. The hopper 20 has a first structural portion 22 that has an inclined shape overall, and a second structural portion 24 that is rectilinear and whose upper end side is connected to the lower end side of the first structural portion 22. The first structural portion 22 of the hopper 20 is supported by an unillustrated device frame via a supporting bracket 26. A receiving port 22A for receiving sand is formed in the upper end of the first structural portion 22 of the hopper 20. Note that, at the time when the measuring device 10 is operated, sand is sufficiently accumulated in the hopper 20.

In the present embodiment, a vibrator (vibrator) 48 (shown as a block in the drawings) is fixed to the hopper 20. By operating, the vibrator 48 can vibrate the hopper 20. The vibrator 48 is connected to the control section 18. The operation of the vibrator 48 is controlled based on commands from the control section 18 (details thereof are described later).

Figure 2A:
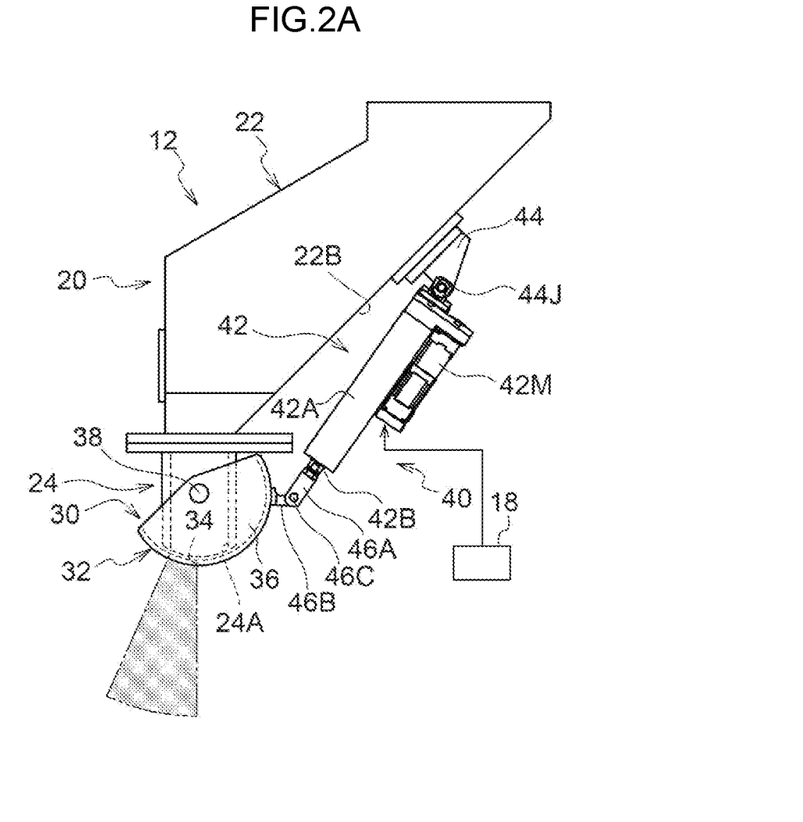
FIG. 2A is a front view showing a state at a time when supplying of sand starts.
Figure 2B:
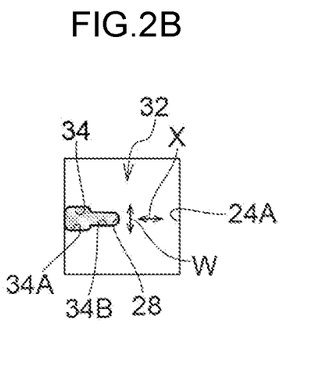
FIG. 2B shows a lower end opening side of a hopper that is in the state at the time when the supplying of sand starts, in an enlarged manner and seen from the upper side.
Figure 2C:
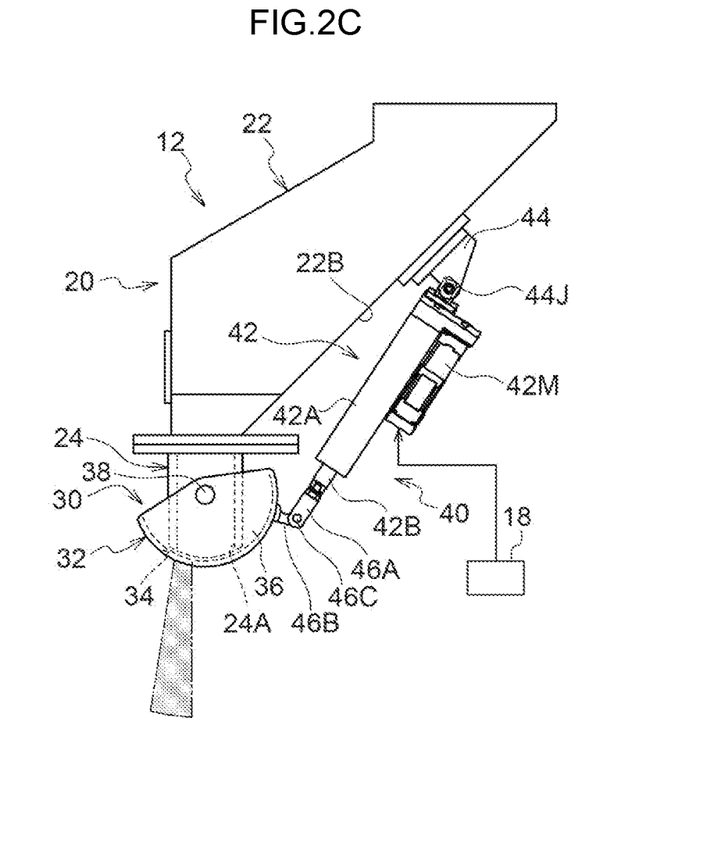
FIG. 2C is a front view showing a state nearing the final stage of the supplying of sand.
Figure 2D:
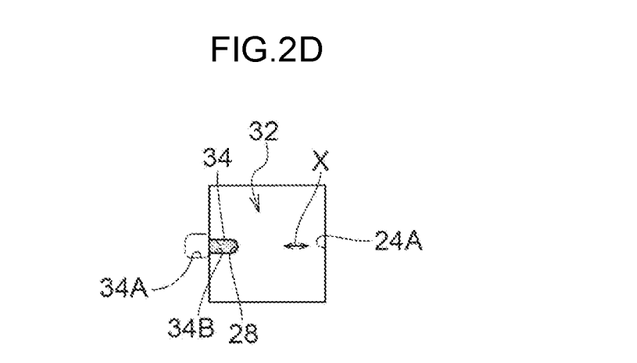
FIG. 2D shows the lower end opening side of the hopper that is in the state nearing the final stage of the supplying of sand, in an enlarged manner and seen from the upper side.
Figure 3A:
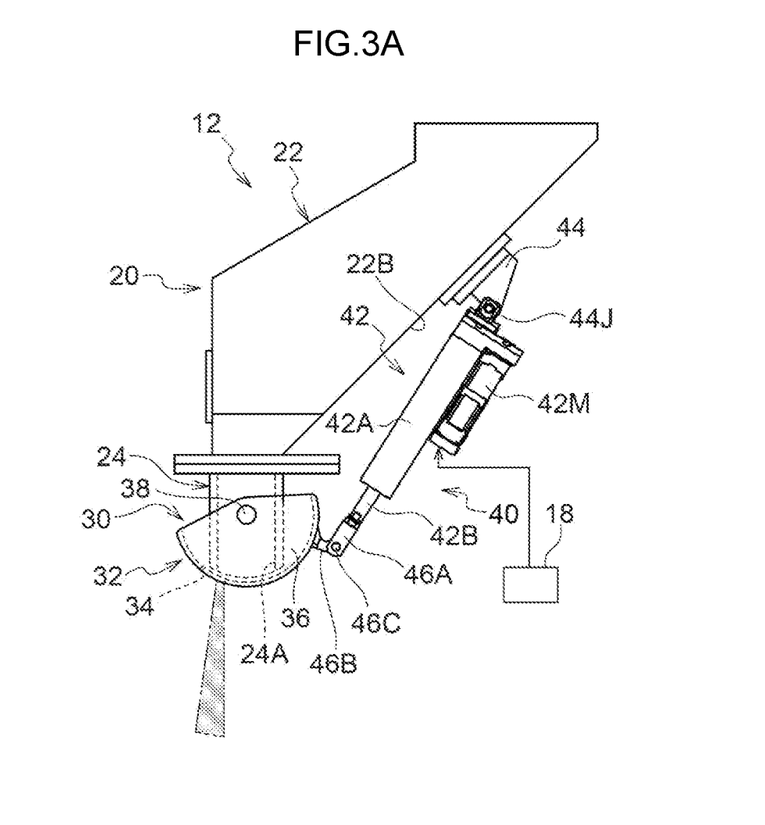
FIG. 3A is a front view showing the state of the final stage of the supplying of sand.
Figure 3B:
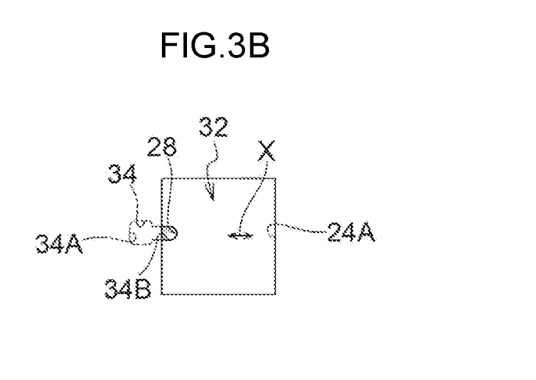
FIG. 3B shows the lower end opening side of the hopper in the state of the final stage of the supplying of sand, in an enlarged manner and seen from the upper side.
Figure 3C:
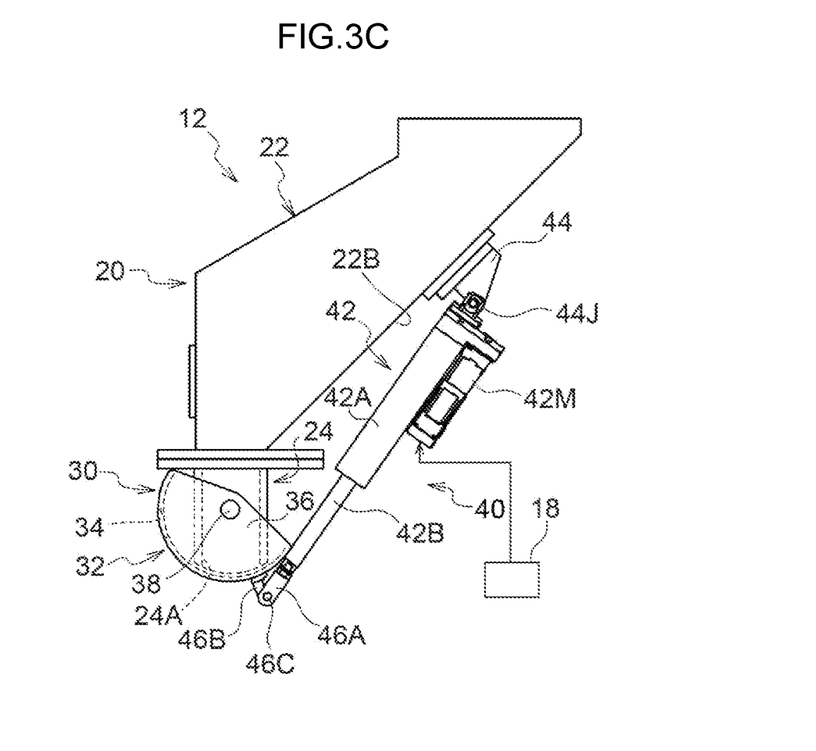
FIG. 3C is a front view showing a state in which the supplying of sand is stopped.
Figure 3D:
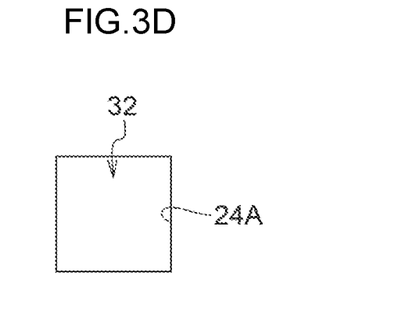
FIG. 3D shows the lower end opening side of the hopper in the state in which the supplying of sand is stopped, in an enlarged manner and seen from the upper side.

The supply device 12 for measurement, which is in the state at the time when the supplying of sand starts, is shown in FIG. 2A and FIG. 2B, and the supply device 12 for measurement, which is in a state nearing the final stage of the supplying of sand, is shown in FIG. 2C and FIG. 2D. Further, the supply device 12 for measurement, which is in the state of the final stage of the supplying of sand, is shown in FIG. 3A and FIG. 3B, and the supply device 12 for measurement, which is in the state in which the supplying of sand is stopped, is shown in FIG. 3C and FIG. 3D. Moreover, front views that are simplified appropriately are shown in FIG. 2A, FIG. 2C, FIG. 3A and FIG. 3C, and states, in which a lower end opening 24A side of the hopper 20 (see FIG. 2A, FIG. 2C, FIG. 3A and FIG. 3C) is enlarged and is seen from the upper side at the inner side of the second structural portion 24 of the hopper 20, are shown in FIG. 2B, FIG. 2D, FIG. 3B and FIG. 3D.

As shown in these drawings, the gate 30 has an opening/closing plate portion 32 that is for opening and closing the square lower end opening 24A of the hopper 20, and that, together with the lower end opening 24A, can form a supply port 28 for sand (the granular substance). Note that, in FIG. 2A through FIG. 3B, the inner side region of the supply port 28 is marked with dots in order to make the drawings easy to understand. As shown in FIG. 2A through FIG. 3D, an opening portion 34 that is substantially slit-shaped is formed so as to pass-through the opening/closing plate portion 32 of the gate 30. The opening portion 34 can be disposed at a region overlapping the lower end opening 24A of the hopper 20. Note that, in FIG. 2D and FIG. 3B, the region of the opening portion 34, which region does not overlap the lower end opening 24A of the hopper 20, is shown by the imaginary lines (the two-dot chain lines).

As shown in FIG. 2B, the opening portion 34 is structured by a first pass-through portion 34A, and a second pass-through portion 34B that is formed to be continuous with the first pass-through portion 34A. Further, the first pass-through portion 34A is formed substantially in the shape of a rectangle that is long in the lined-up direction (refer to the arrow X direction) in which the first pass-through portion 34A and the second pass-through portion 34B are lined-up. The width, in the direction (refer to the arrow W direction) orthogonal to the direction of being lined-up with the first pass-through portion 34A, of the second pass-through portion 34B is narrow as compared with the first pass-through portion 34A. The length direction of this second pass-through portion 34B is the lined-up direction (refer to the arrow X direction) in which the first pass-through portion 34A and the second pass-through portion 34B are lined-up. The second pass-through portion 34B is formed in a shape in which a region, at which the width (the dimension in the arrow W direction) is constant, extends (a shape that can also be called a "slit shape" when interpreted broadly).

As shown in FIG. 2A through FIG. 3D, the gate 30 is supported so as to be able to rotate (refer to the arrow R1 directions in FIG. 1) around a shaft 38 that runs along the horizontal direction. The opening/closing plate portion 32 is formed in the shape of a circular arc whose center is the shaft 38, as seen from the extending direction of the shaft 38. Namely, the gate 30 is structured so as to be able to change (so as to be able to adjust) the size of the supply port 28 by moving in the lined-up direction (refer to the arrow X direction) in which the first pass-through portion 34A and the second pass-through portion 34B are lined-up, as seen in a plan view. Note that the lower end surface of the second structural portion 24 of the hopper 20 is set so as to run along the circular arc shape of the opening/closing plate portion 32. Further, the gate 30 has, at the both lateral sides of the extending direction of the shaft 38, a pair of side plate portions 36 that are connected to the opening/closing plate portion 32 and structure the side surfaces. The side plate portions 36 are formed in substantial fan shapes as seen in the extending direction of the shaft 38. Note that, in the drawings, only the side plate portion 36 at the near side in the drawings is illustrated, but the side plate portion 36 that is at the far side in the drawings also has a shape that is similar to that of the side plate portion 36 that is at the near side in the drawings. Further, in FIG. 2A, FIG. 2C and FIG. 3A, the granular substance that is supplied to the measuring/pouring device 14 (see FIG. 1) from the supply device 12 for measurement is shown schematically by dots.

The driving mechanism 40 that is for driving the gate 30 is structured to include a servo cylinder 42. The servo cylinder 42 is provided at the lateral side and the lower side of the first structural portion 22 of the hopper 20. The proximal end mounting portion of the servo cylinder 42 is mounted to the upper portion of an inclined lower surface 22B of the first structural portion 22 of the hopper 20 via a bracket 44. Slight rotation around a shaft 44J, which is set parallel to the shaft 38 that is the center of rotation of the gate 30, with respect to the bracket 44 is permitted.

The servo cylinder 42 has a cylinder 42A and a piston rod 42B. The cylinder 42A and the piston rod 42B extend so as to be inclined toward the hopper 20 side while heading toward the device lower side. The proximal end portion of the piston rod 42B has an unillustrated female screw portion and is disposed within the cylinder 42A, and is screwed-together with an unillustrated ball screw. Due thereto, the proximal end portion of the piston rod 42B is structured so as to, due to the ball screw rotating, move relative to the cylinder 42A in the length direction thereof.

Further, the servo cylinder 42 has an electric servo motor 42M that is disposed in parallel at the lateral side and the lower side of the upper half of the cylinder 42A. This electric servo motor 42M is for rotating and driving the ball screw. Namely, the motor shaft of the electric servo motor 42M is connected to the ball screw via an unillustrated driving force transmitting mechanism (e.g., a driving force transmitting mechanism that includes timing pulleys and a timing belt). Further, as shown in FIG. 1, the electric servo motor 42M is connected to the control section 18, and the driving of the electric servo motor 42M is controlled based on commands from the control section 18.

As shown in FIG. 2A through FIG. 3D, one end side of a first connecting member 46A is fixed to the distal end portion of the piston rod 42B. The another end side of the first connecting member 46A is connected to the extending distal end side of a second connecting member 46B that is fixed to the opening/closing plate portion 32 of the gate 30. The second connecting member 46B can rotate around a shaft 46C, which is set parallel to the shaft 38 that is the center of rotation of the gate 30, with respect to the another end side of the first connecting member 46A.

Due to the driving mechanism 40 causing the piston rod 42B to extend from and retract into the cylinder 42A by the driving of the electric servo motor 42M, the driving mechanism 40 rotates the gate 30 around the shaft 38, or, in other words, the driving mechanism 40 moves the gate 30 such that the opening/closing plate portion 32 of the gate 30 moves in the lined-up direction (refer to the arrow X direction) in which the first pass-through portion 34A and the second pass-through portion 34B are lined-up, as seen in plan view.

As shown in FIG. 1, the measuring/pouring device 14 that is set at the lower side of the supply device 12 for measurement has a container 50 and a scale 54. The container 50 is disposed at the lower side of the hopper 20, and sand (the granular substance) is supplied thereto from the supply port 28 (see FIG. 2A through FIG. 3D). The container 50 is supported at the scale 54 via a supporting mechanism 52. The scale 54 is structured by a load cell as an example, and measures the weight of the sand that is supplied to the container 50. The scale 54 is connected to the control section 18. The electric signal of the measured value that is outputted from the scale 54 is inputted to the control section 18.

The container 50 is supported by the supporting mechanism 52 so as to be able to swing (refer to the arrow R2 directions) between a receiving posture 50X for receiving a supply of sand, and a pouring posture 50Y for pouring sand into the stirring tank 60A. As seen in a front view, the supporting mechanism 52 has a mounting hole 52A that is formed in a circular arc shape that is convex toward the upper side, with respect to the container 50. A first proximity switch 52B1 for detecting the receiving posture 50X of the container 50 is mounted to the right side of the mounting hole 52A. A second proximity switch 52B2 for detecting the pouring posture 50Y of the container 50 is mounted to the left side of the mounting hole 52A. On the other hand, a magnetic body 50A, which is displaced integrally with the container 50 and can approach the first proximity switch 52B1 and the second proximity switch 52B2 respectively, is fixed to the container 50. In the state in which the container 50 is in the receiving posture 50X, the magnetic body 50A is disposed at the position of the magnetic body 50A that is shown by the dotted line at the right side in the drawing, and, in the state in which the container 50 is in the pouring posture 50Y, the magnetic body 50A is disposed at the position of the magnetic body 50A that is shown by the two-dot chain line at the left side in the drawing.

The first proximity switch 52B1 is structured so as to, when the magnetic body 50A approaches the first proximity switch 52B1, set an electrical circuit (a control circuit portion) that includes the first proximity switch 52B1 in a conductive state, and the first proximity switch 52B1 detects that the magnetic body 50A has approached the first proximity switch 52B1, i.e., detects that the container 50 is in the receiving posture 50X. Further, the second proximity switch 52B2 is structured so as to, when the magnetic body 50A approaches the second proximity switch 52B2, set an electrical circuit (a control circuit portion) that includes the second proximity switch 52B2 in a conductive state, and the second proximity switch 52B2 detects that the magnetic body 50A has approached the second proximity switch 52B2, i.e., detects that the container 50 is in the pouring posture 50Y. Further, the first proximity switch 52B1 and the second proximity switch 52B2 are respectively connected to the control section 18. The electric signals of the respective results of detection of the first proximity switch 52B1 and the second proximity switch 52B2 are inputted to the control section 18.

The supporting mechanism 52 has an actuator 52C (shown as a block in the drawings), and the actuator 52C swings the container 50 between the receiving posture 50X and the pouring posture 50Y. The actuator 52C is connected to the control section 18. The driving of the actuator 52C is controlled based on commands from the control section 18. Namely, the actuator 52C is controlled by the control section 18 so as to set the container 50 in the pouring posture 50Y at a predetermined time when the weight of the sand within the container that is at the receiving posture 50X becomes a target value, and so as to set in the container 50 in the receiving posture 50X at a predetermined time after the sand within the container 50 has been poured into the stirring tank 60A.

Control of the driving mechanism 40 by the control section 18 is described next.

The control section 18 controls the driving mechanism 40 based on a preset target value of the weight of the sand, so as to decrease the amount of overlap of the opening portion 34 of the gate 30 shown in FIG. 2A through FIG. 3D and the lower end opening 24A of the hopper 20 in a stepwise manner, in accordance with the increase in the weight of the sand measured by the scale 54. Namely, in the present embodiment, the control section 18 controls the driving mechanism 40 such that the overlapping state of the opening portion 34 of the gate 30 and the lower end opening 24A of the hopper 20 goes through a first step of becoming the state shown in FIG. 2A and FIG. 2B, and a second step of becoming the state shown in FIG. 2C and FIG. 2D, and a third step of becoming the state shown in FIG. 3A and FIG. 3B. Further, when the weight of the sand measured by the scale 54 (see FIG. 1) coincides with the target value, the control section 18 controls the driving mechanism 40 such that a state occurs in which the opening portion 34 is adjacent to, or is distant from the lower end opening 24A, as shown in FIG. 3C and FIG. 3D.

The first step shown in FIG. 2A and FIG. 2B is a step in which the state, in which an entire region of the opening portion 34 of the gate 30 overlaps the lower end opening 24A of the hopper 20, is maintained over a predetermined time period. This first step is set so as to be maintained from the time of the start of the supplying of sand from the supply port 28 until the weight of the sand that is measured by the scale 54 (see FIG. 1) becomes a preset first proportion (e.g., 80%) with respect to the target value. Note that the above-described first proportion basically is preferably 50% or more, but can be set appropriately in accordance with the target value of the weight of the sand, or the like. For example, if the target value of the weight of the sand is small, this first proportion can be set to be low, and, if the target value of the weight of the sand is large, this first proportion can be set to be high.

The second step shown in FIG. 2C and FIG. 2D is a step in which a state in which an entire region of the first pass-through portion 34A of the opening portion 34 of the gate 30 does not overlap the lower end opening 24A of the hopper 20, and a partial region of the opening portion 34, and more specifically, the entire region of the second pass-through portion 34B of the opening portion 34, overlaps the lower end opening 24A, is maintained over a predetermined time period. The second step is set to be maintained after the first step ends until the weight of the sand that is measured by the scale 54 (see FIG. 1) becomes a preset second proportion (e.g., 95%) with respect to the target value. Note that the above-described second proportion is preferably 90% or more, but can be set appropriately in accordance with the target value of the weight of the sand, or the like. For example, if the target value of the weight of the sand is small, this second proportion can be set to be low, and, if the target value of the weight of the sand is large, this second proportion can be set to be high.

The third step that is shown in FIG. 3A and FIG. 3B is a step in which a state in which an entire region of the first pass-through portion 34A of the opening portion 34 of the gate 30 is adjacent to, or is distant from the lower end opening 24A of the hopper 20, and a partial region of the opening portion 34, and more specifically, only a partial region (approximately half) of the second pass-through portion 34B of the opening portion 34, overlaps the lower end opening 24A, is maintained for a predetermined time period. The third step is set so as to be maintained after the second step ends until the weight of the sand measured by the scale 54 (see FIG. 1) reaches the target value.

Control of the vibrator 48, which is shown in FIG. 1, by the control section 18 is described next.

The control section 18 controls the vibrator 48 such that the hopper 20 is vibrated by the vibrator 48 in a case in which the time period, from the point in time when the supplying of sand from the supply port 28 (see FIG. 2A and FIG. 2B) into the container 50 starts, exceeds a preset time period, and the weight of the sand that is measured by the scale 54 has not reached the preset target value of the weight. Note that it is possible to add a structure in which, in a case in which the weight of the sand measured by the scale 54 does not increase even if the hopper 20 is vibrated by the vibrator 48, the control section 18 controls an unillustrated notification sound issuing device such that a warning sound is issued by the notification sound issuing device. Further, in a case in which such a structure is added, the control section 18 may control the respective operational sections of the measuring device 10 so as to stop the measuring device 10 after the warning sound is issued.

(Workings, and Operation and Effects, of Measuring Device 10)

Next, the workings of the measuring device 10 that is controlled by the control section 18 will be described, and the operation and effects of the above-described embodiment will be described.

When a user carries out an operation to start working from the operation section 16, the driving mechanism 40 that is in the state shown in FIG. 3C and FIG. 3D operates, the piston rod 42B that projects-out from the cylinder 42A is retracted-in, there becomes the first step that is shown in FIG. 2A and FIG. 2B, and the supplying of sand from the supply port 28 into the container 50 (see FIG. 1) is started. In this first step, because the entire region of the opening portion 34 of the gate 30 overlaps the lower end opening 24A of the hopper 20, the degree of opening of the supply port 28 is the maximum, and the supplied amount per unit time can be made to be large. Further, the rotational angle of the gate 30 that is shown in FIG. 2A and FIG. 2B is maintained from the time of the start of the supplying of sand from the supply port 28 until the weight of the sand measured by the scale 54 (see FIG. 1) becomes a preset first proportion (e.g., 80%) with respect to the target value.

Next, when the weight of the sand measured by the scale 54 (see FIG. 1) reaches the preset first proportion (e.g., 80%) with respect to the target value, the driving mechanism 40 operates, the piston rod 42B is extended from the cylinder 42A, and there becomes the second step that is shown in FIG. 2C and FIG. 2D. In this second step, the entire region of the first pass-through portion 34A is adjacent to, or is distant from the lower end opening 24A of the hopper 20, and, of the opening portion 34, the entire region of the second pass-through portion 34B overlaps the lower end opening 24A. Further, the rotational angle of the gate 30 that is shown in FIG. 2C and FIG. 2D is maintained until the weight of the sand measured by the scale 54 (see FIG. 1) becomes a preset second proportion (e.g., 95%) with respect to the target value.

Next, when the weight of the sand measured by the scale 54 (see FIG. 1) reaches the preset second proportion (e.g., 95%) with respect to the target value, the driving mechanism 40 operates, the piston rod 42B is extended from the cylinder 42A, and there becomes the third step that is shown in FIG. 3A and FIG. 3B. In this third step, of the opening portion 34, only a partial region (approximately half) of the second pass-through portion 34B overlaps the lower end opening 24A, and therefore, the granular substance exceeding the target weight can be effectively suppressed by limiting (fine-tuning) the supplied amount per unit time.

When this third step is maintained (in other words, the angle of rotation of the gate 30 shown in FIG. 3A and FIG. 3B is maintained), and the weight of the sand that is measured by the scale 54 (see FIG. 1) coincides with the preset target value of the weight, the driving mechanism 40 operates, the piston rod 42B is extended from the cylinder 42A, there becomes the state shown in FIG. 3C and FIG. 3D in which the opening portion 34 is adjacent to, or is distant from the lower end opening 24A, and the supplying of sand from the supply port 28 is stopped. Here, in the third step that is shown in FIG. 3A and FIG. 3B, the overlapping of the opening portion 34 of the gate 30 and the lower end opening 24A of the hopper 20 is extremely small, and therefore, the supplying of the granular substance can be stopped immediately when the weight of the sand within the container 50 (see FIG. 1) reaches the target value. Accordingly, the weight of the granular substance within the container 50 shown in FIG. 1 can be made to match the target value of the weight with high accuracy.

Next, the supporting mechanism 52 operates, the container 50 swings from the receiving posture 50X to the pouring posture 50Y, and the sand within the container 50 is poured into the stirring tank 60A. Thereafter, at a predetermined time, the supporting mechanism 52 operates, and the container 50 swings from the pouring posture 50Y to the receiving posture 50X. Thereafter, basically, the above-described workings of the measuring device 10 are repeated until the user carries out an operation to stop working from the operation section 16.

Further, in the present embodiment, because the driving mechanism 40 is structured to include the electric servo motor 42M, the gate 30 can be moved precisely by the driving of the electric servo motor 42M, and, as a result, the desired amount of sand is supplied highly accurately to the container 50 in each step. Moreover, in the present embodiment, as shown in FIG. 2B and the like, the length direction of the second pass-through portion 34B is the lined-up direction (refer to the arrow X direction) in which the first pass-through portion 34A and the second pass-through portion 34B are lined-up, and the second pass-through portion 34B is formed in a shape in which a region, whose width (the arrow W direction dimension) is constant, extends. Therefore, it is easy to control the amount, per unit time, of the granular substance that passes-through the supply port 28 (see FIG. 2B, FIG. 2D and FIG. 3B).

As described above, in accordance with the measuring device 10 of the present embodiment that is shown in FIG. 1, sand can be measured at high speed and with high accuracy.

Further, in the present embodiment, at the gate 30, the pair of side plate portions 36 are connected to the opening/closing plate portion 32 at the both lateral sides in the extending direction of the shaft 38, and structure the side surfaces. Therefore, at the time when sand is supplied to the container 50 from the supply port 28 shown in FIG. 2A through FIG. 2D and FIG. 3A and FIG. 3B, sand spilling over into the container 50 from portions other than the supply port 28 can be suppressed well by the pair of side plate portions 36.

Further, in the present embodiment, the hopper 20 is vibrated by the vibrator 48 in a case in which the time period, from the point in time when the supplying of sand from the supply port 28 into the container 50 starts, exceeds a preset time period, and the weight of the sand measured by the scale 54 shown in FIG. 1 has not reached the preset target value of the weight. Accordingly, even in a case in which, for example, it is difficult for the sand within the hopper 20 to flow or the sand becomes packed together in an extremely high humidity environment, the sand within the hopper 20 can be made to flow due to the hopper 20 being vibrated by the vibrator 48.

(Supplementary Explanation of Embodiment)

Note that, as a modified example of the above-described embodiment, in a case in which, for example, the length in the length direction of the opening portion of the gate (the lined-up direction in which the first pass-through portion and the second pass-through portion are lined-up) is set to be longer than the diameter of the lower end opening of the hopper, the control section may control the driving mechanism so as to go through a step in which a state, in which an entire region of the first pass-through portion of the opening portion of the gate overlaps the lower end opening of the hopper, and a partial region of the opening portion is adjacent to, or is distant from the lower end opening of the hopper, is maintained for a predetermined time period.

Further, as a modified example of the above-described embodiment, a structure can be employed in which the control section controls the driving mechanism so as to go through a step in which a state, in which an entire region or substantially the entire region of the first pass-through portion is adjacent to, or is distant from the lower end opening of the hopper, and the entire region of the second pass-through portion of the opening portion overlaps the lower end opening, is maintained for a predetermined time period, and moreover, such that a state, in which only a partial region of the second pass-through portion of the opening portion overlaps the lower end opening, is not maintained for a predetermined time period.

Further, as a modified example of the above-described embodiment, instead of the second pass-through portion 34B that is shown in FIG. 2B and the like, a structure can be employed that uses a second pass-through portion, whose length direction is not the lined-up direction in which the first pass-through portion and the second pass-through portion are lined-up, or a second pass-through portion, that has a width is reduced little-by-little toward the side opposite the first pass-through portion.

Moreover, as a modified example of the above-described embodiment, the lower end opening of the hopper may be a shape other than a square shape, such as a rectangular or circular or the like. Note that a case in which the lower end opening of the hopper is made to be, for example, a circular shape that is set at the position of an inscribed circle of the lower end opening 24A of the above-described embodiment, and the edge of this circular lower end opening of the hopper is at a position that passes through two points that are the border points between the opening end of the first pass-through portion and the opening end of the second pass-through portion, and the entire region of the second pass-through portion is in a state of overlapping the lower end opening of the hopper, can be understood as being the "state in which substantially the entire region of the first pass-through portion is adjacent to, or is distant from the lower end opening of the hopper" of claim 1.

Further, as a modified example of the above-described embodiment, a structure that is flat-plate-shaped and that moves in the horizontal direction may be used as the gate.

Further, as a modified example of the above-described embodiment, the driving mechanism may be structured so as to include an electric servo motor whose motor shaft is connected to the rotating shaft of the gate. Further, as a modified example of the above-described embodiment, the driving mechanism may be structured to include a hydraulic servo motor or an air-pressure servo motor, or may be structured to include an air cylinder or the like. Further, for controlling the driving mechanism, plural proximity sensors may be disposed so as to be adjacent to the moving path of the opening/closing plate portion of the gate.

Moreover, in the above-described embodiment, sand is given as an example of the granular substance, but another granular substance such as detergent or rice or the like may be used as the granular substance.

Further, as a modified example of the above-described embodiment, a structure may be employed in which the vibrator 48 that is shown in FIG. 1 is not provided.

Note that the above-described embodiment and above-described plural modified examples may be implemented by being combined appropriately.

Although an example of the present disclosure has been described above, the present disclosure is not limited to the above, and, other than the above, can of course be implemented by being modified in various ways within a scope that does not depart from the gist thereof.

The disclosure of Japanese Patent Application No. 2018-131032 that was filed on Jul. 10, 2018 is, in its entirety, incorporated by reference into the present specification.

The invention claimed is:

1. A measuring device comprising:
a hopper that receives a granular substance that is an object of measurement;
a gate that has an opening/closing plate portion for opening and closing a lower end opening of the hopper, wherein the opening/closing plate portion and the lower end opening form a supply port of the granular substance, wherein an opening portion is formed in the opening/closing plate portion that is structured by a first pass-through portion and a second pass-through portion integrally formed with the first pass-through portion, wherein the second-pass through portion has a width in a direction orthogonal to a lined-up direction, wherein the first pass-through portion and the second pass-through portion are lined up in the lined-up direction, wherein the width of the second-pass through portion in the direction is narrower than the first pass-through portion, and wherein the opening portion is disposed at a region overlapping the lower end opening;
a driving mechanism that moves the gate such that the opening/closing plate portion moves in the lined-up direction;
a measuring section that is provided at a lower side of the hopper, and that measures a weight of the granular substance that is supplied from the supply port; and
a control section that, based on predetermined target value of the weight of the granular substance, controls the driving mechanism such that an amount of overlap of the opening portion and the lower end opening decreases in response to an increase in the weight of the granular substance measured by the measuring section, and wherein when the weight of the granular substance measured by the measuring section coincides with the target value and the opening portion is adjacent to, or is distant from, the lower end opening, the control section is configured to maintain (i) a state that an entire region of the first pass-through portion overlaps the lower end opening during a first predetermined time period, and then (ii) a state that an entire region or substantially the entire region of the first pass-through portion is adjacent to, or is distant from, the lower end opening and a partial region of the opening portion overlaps the lower end opening during a second predetermined time period.

2. The measuring device of claim 1, wherein the second pass-through portion has a length in the lined-up direction, and wherein the second-pass through portion is formed in a shape such that a region of the second-pass through portion at which the width is constant extends in the shape.

3. The measuring device of claim 2, wherein the control section controls the driving mechanism to maintain a state that only a partial region of the second pass-through portion of the opening portion overlaps the lower end opening during a third predetermined time period.

4. The measuring device of claim 1, wherein the control section controls the driving mechanism to maintain a state that an entire region of the opening portion overlaps the lower end opening during a fourth predetermined time period.

5. The measuring device of claim 1, wherein:
the gate is supported for rotation around a shaft that runs along a horizontal direction,
the opening/closing plate portion is formed in a shape of a circular arc whose center is the shaft, and
the gate has, at both lateral sides of the shaft, a pair of side plate portions that are connected to the opening/closing plate portion and that define side surfaces.

6. The measuring device of claim 1, wherein the driving mechanism includes an electric servo motor.

7. The measuring device of claim 1, further comprising:
a vibrator that vibrates the hopper,
wherein the control section controls the vibrator to vibrate the hopper by the vibrator such that when a time period that begins from a point in time at which supply of the granular substance from the supply port to the measuring section starts exceeds a preset time period, a weight of the granular substance that is measured at the measuring section has not reached the target value.

* * * * *